United States Patent [19]

Bussard

[11] 4,370,296

[45] Jan. 25, 1983

[54] TOROIDAL FUSION REACTOR HAVING OHMIC HEATING COIL SUBSTANTIALLY ADJACENT TOROIDAL FUSION REGION

[75] Inventor: Robert W. Bussard, Arlington, Va.

[73] Assignee: FDX Associates, L.P., La Jolla, Calif.

[21] Appl. No.: 157,347

[22] Filed: Jun. 9, 1980

Related U.S. Application Data

[63] Continuation of Ser. No. 888,803, Mar. 21, 1978, abandoned.

[51] Int. Cl.³ .............................................. G21B 1/00
[52] U.S. Cl. .................................. 376/133; 376/142; 376/146; 335/296; 336/229
[58] Field of Search ................. 176/1, 3, 9; 75/123 H; 148/31.57, 31.55; 335/296, 302; 336/DIG. 3, 229

[56] References Cited

U.S. PATENT DOCUMENTS

| | | | |
|---|---|---|---|
| 3,117,912 | 1/1964 | Imhoff et al. | 176/9 |
| 3,303,449 | 2/1967 | Stimler | 176/3 |
| 3,546,030 | 12/1970 | Buschow et al. | 148/31.57 |
| 3,639,181 | 2/1972 | Cech | 148/31.57 |
| 4,065,350 | 12/1977 | Sheffield | 176/9 |

OTHER PUBLICATIONS

Proceedings of the 7th Symp. on Eng. Probs. of Fusion Research, vol. 1, 10/77, pp. 121-124, 193-197, 469-472, 625-633, 818-825.
Nuclear Technology, vol. 29, 6/76, Fon Su et al. pp. 392-405.
ANL/CTR-76-3, vol. 1 & 2, 8/76.
CONF-760733, 7/76.
ERDA-4, Dec. 1974.

Primary Examiner—Harvey E. Behrend
Attorney, Agent, or Firm—Schwartz, Jeffery, Schwaab, Mack, Blumenthal & Koch

[57] ABSTRACT

A fusion reactor of the toroidal-type having a plasma containing toroidal fusion region producing energy from fusion reactions and comprising a toroidal field generating means for producing a toroidal magnetic field in the fusion region upon passage of current therethrough, said toroidal field generating means positioned proximate the toroidal fusion region, and ohmic heating coils for ohmically heating the plasma wherein the ohmic heating coils are positioned between the toroidal fusion region and the toroidal field generating means.

8 Claims, 8 Drawing Figures

TOROIDAL FUSION REACTOR HAVING OHMIC HEATING COIL SUBSTANTIALLY ADJACENT TOROIDAL FUSION REGION

This is a continuation, of application Ser. No. 888,803, filed Mar. 21, 1978 now abandoned.

BACKGROUND OF THE INVENTION

1. Field of the Invention

The invention is in the field of fusion reactor designs and particularly relates to ohmic heating coils for toroidal-type fusion reactors. The invention is also applicable to fusion-fission hybrid type reactors.

2. Description of the Prior Art

A large number of studies have been directed to the design of toroidal-type fusion reactors as well as to the design of fusion-fission reactors. Representative studies include the following: *Tokamak Experimental Power Reactor Conceptual Design,* Volumes I and II, Argon National Laboratory, ANL/CTR-76-3, August 1976; *Proceedings US-USSR Symposium on Fusion-Fission Reactors,* July 13–16, 1976; and *DCTR Fusion-Fission Energy Systems Review Meeting,* Dec. 3–4, 1974, ERDA-4. In typical prior art toroidal-type fusion experiments and designs, the ohmic heating coil takes the form of a transformer positioned in the center of the toroidal configuration as illustrated, for example, in U.S. Pat. No. 3,778,343. It has long been desired to decrease the size of this OH transformer, particularly in view of the rather stringent space requirements present in existing machines. Attempts have been made, for example, to specifically design the toroidal field coils surrounding the plasma region to optimize space requirements within the toroidal region center along the main axis of the toroid. Such studies are exemplified by U.S. Pat. No. 3,859,615. The ability to utilize the interior space of a toroid would greatly relax the stringent design requirements imposed on toroidal-type fusion reactors and permit the utilization of lower current densities within the TF coils.

SUMMARY OF THE INVENTION

Accordingly, it is an object of the invention to increase the operating efficiency of toroidal-type fusion reactors.

It is a further object of the invention to remove the ohmic heating transformer from the region of the main axis of the toroidal field coils to thereby enable radial expansion of the TF coil cross-sectional area within the region of the main axis.

Yet another object of the invention is to provide a more efficient ohmic heating coupling to the plasma region of a fusion device of the toroidal-type.

A further object of the invention is to provide a more efficient ohmic heating coupling for fusion-fission type reactors or power generating devices.

In accordance with the principles of the invention there is provided a fusion reactor of the toroidal-type having a plasma containing toroidal fusion region for producing energy from fusion reactions. The fusion reactor comprises toroidal field generating means for producing a toroidal magnetic field in the plasma fusion region upon the passage of current therethrough. The toroidal field generating means is positioned proximate the toroidal fusion region. Ohmic heating coils are provided for ohmically heating the plasma within the plasma fusion region, and the ohmic heating coils are positioned between the fusion region and the toroidal field generating means on the side nearest the main axis of the toroidal fusion region.

There is also disclosed in accordance with the principles of the invention a method of increasing efficiency of a fusion reactor of a toroidal configuration having toroidal field coils positioned substantially adjacent a toroidal fusion region and ohmic heating coils for ohmically heating plasma within the toroidal fusion region. The method comprises the step of positioning the ohmic heating coils between the toroidal fusion region and the toroidal field coils on a side nearest the main axis of the toroidal fusion region.

There is also disclosed in accordance with the principles of the invention a fusion power generating means comprising a fusion power core having a toroidal fusion region, a toroidal field generating means positioned proximate the toroidal fusion region and an ohmic heating means positioned between the toroidal fusion region and the toroidal generating means. Further, the power generating means comprises means for extracting thermal energy from the fusion power core and is constructed such that the fusion power core is removable from the power generating means for replacement thereof by a replacement fusion power core.

BRIEF DESCRIPTION OF THE DRAWINGS

These and other objects of the invention will become apparent in reference to the specification and drawings wherein.

DETAILED DESCRIPTION OF THE PREFERRED EMBODIMENT

Figure 1:
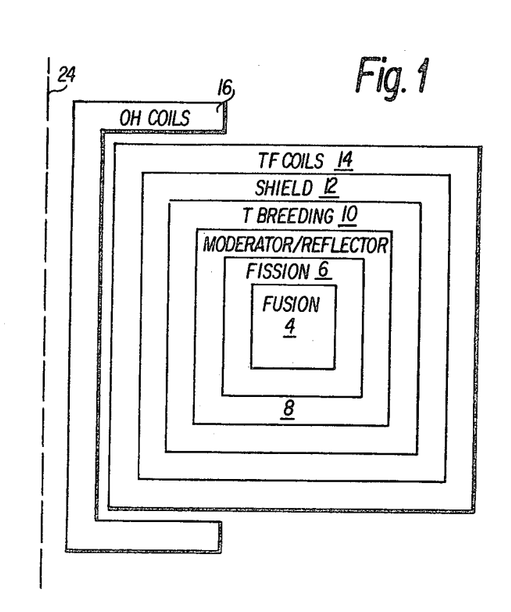
FIG. 1 is a block schematic diagram of prior art reactors.

FIG. 1 is a block diagram of prior art toroidal-type fusion-fission reactor designs. The figure illustrates a cross-sectional representative view of the toroid which is symmetric about a major axis 24. Typically, a toroidal fusion region 4 is provided for housing the fusion fuel which may be, for example, a mixture of deuterium and tritium. Surrounding the fusion region 4 is a fission blanket 6 which contains fissionable material such as natural uranium ($U^{238}$) or a uranium alloy. A moderator/reflector region 8 is also provided around the fission blanket 6 to slow down fast neutrons produced in both the fusion and fission regions and to reflect these neutrons as low energy neutrons back into the fission blanket 6. The resulting thermal neutrons within the fission blanket do not induce fission reactions in $U^{238}$ but rather are captured and lead to the production of fissile material, namely, $Pu^{239}$. After the moderator/reflector region 8 there is generally provided a T breeding section 10 which comprises lithium utilized to breed tritium via thermal and/or fast neutron capture. The tritium may then be utilized to replace tritium consumed by the d,t fusion reaction. Surrounding the T breeding section 10 is a shielding area 12. Toroidal field (TF) coils 14 surround and are protected by the shielding area 12 and are utilized to generate a toroidal field within the fusion region 4. Ohmic heating (OH) coils 16 are also illustrated adjacent the toroidal field coils 14 and are utilized to ohmically heat the plasma fusion region 4.

Figure 2A:
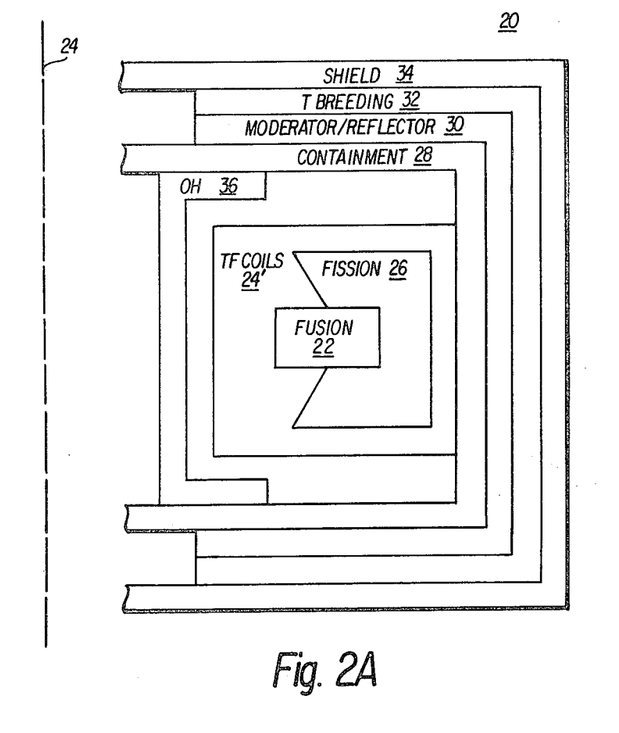
FIGS. 2A and 2B show block schematic diagrams of embodiments of the invention.

FIG. 2a is a schematic block diagram of a toroidal fusion device similar to FIG. 1 but illustrating the novel structural arrangement in accordance with the principles of the invention. Accordingly, a fusion-fission reactor 20 is illustrated comprising a fusion region 22 which is typically in the form of a toroid having a main axis 24. A plurality of toroidal field coils 24' are provided which have incorporated within a region thereof the fissile-fertile material 26. The fissile-fertile material 26, may, of example, comprise natural uranium, a uranium-molybdenum or uranium-zirconium alloy or the like. The fissile-fertile material is fissionable with respect to high energy neutrons produced from the fusion reaction and is fertile with respect to low energy neutrons thus producing additional fissile material. The particular structure of the toroidal field coils 24' and the fissile-fertile material 26 is described more fully below and may typically comprise an integral structure positioned substantially adjacent the fusion region 22 with only a vacuum vessel (and associated cooling panels) therebetween to house the plasma and cool the vacuum vessel first wall.

Surrounding the toroidal field coils 24' and fissile-fertile material 26 is a containment means 28 for housing the toroidal field coils 24'. The containment means 28 may be fabricated from stainless steel, copper or other metals and is provided with an insulative coating to prevent shorting of the TF coils. Also provided within the containment means 28 are the ohmic heating (OH) coils 36. Provisions are made for connecting the OH and TF coils to appropriate power supplies as is well known in the art. A moderator/reflector region 30, fabricated from graphite, for example, is also provided exterior to the containment means, and a T breeding section (lithium) 32 is positioned exterior of the moderator/reflector region 30. A shielding area 34 is also provided around the T breeding section 32.

Figure 2B:
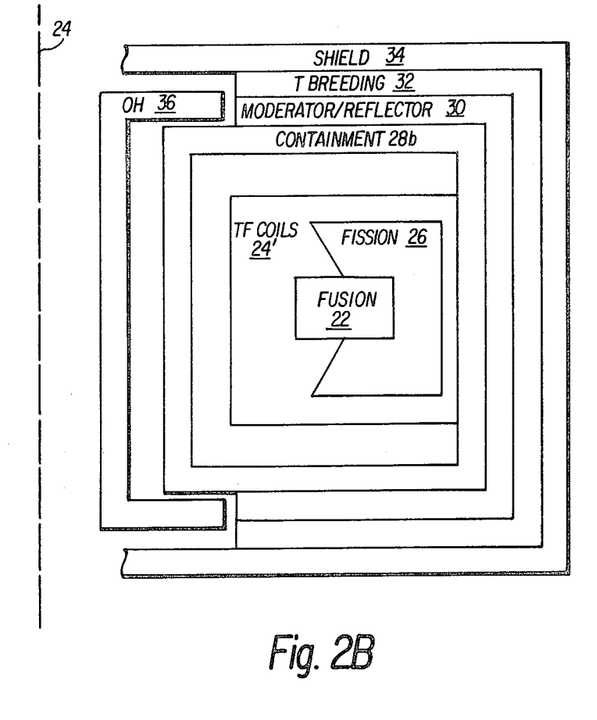

FIG. 2B is another embodiment of the invention similar to FIG. 2A but shows the containment means 28b surrounding the TF coils 24' and fusion region 22 with the OH coils 36 outside thereof. OH coils 36 may also be enclosed in a separate containment means, not shown.

Figure 3:
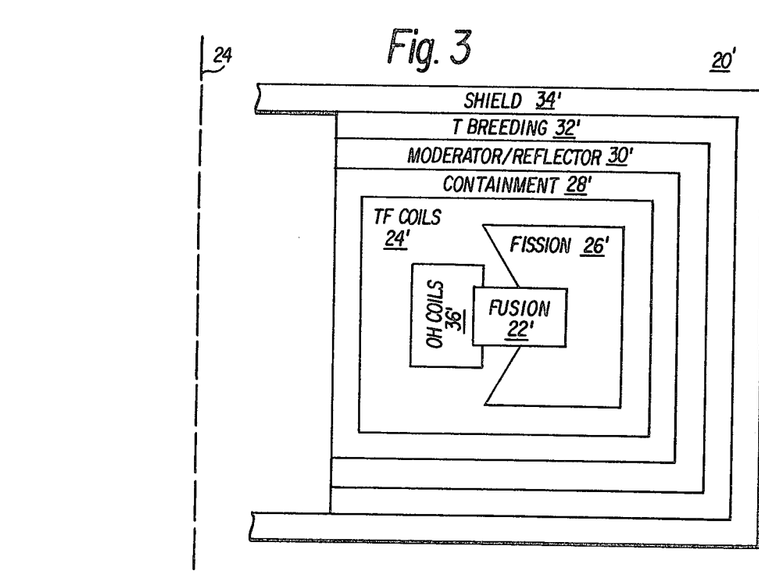
FIG. 3 is a block schematic diagram of yet another embodiment of the invention.

FIG. 3 illustrates yet another embodiment of the invention which is similar to that of FIG. 2 with the exception that the OH coils 36' are now positioned within the region of the toroidal field coils generally disposed in-between the fusion area 22' and the TF coils 34'. Elements similar to those in FIG. 2 are labeled with primes. The embodiment of FIG. 3 essentially frees the interior of the toroidal area near the main axis 24 of the traditional bulky OH coil transformer and provides for the efficient OH heating of the fusion region 22' by positioning the OH coils substantially adjacent the fusion region 22'. Additionally, the removal of the OH coils from the interior region of the toroid permits a more efficient design of the TF coils 24' by allowing for larger TF coil cross-sectional areas within this vicinity of the main axis 24 with substantial reduction in current densities. A resulting increase in TF magnetic strength is achieved which, coupled to a more efficient operation of the OH coils, enhances efficiency and stability of the operation of the fusion region 22'. Positioning the OH coils 36' within the region of the TF coils 24' is applicable to pure fusion toroidal-type reactors as well as the fusion-fission type.

Figure 4:
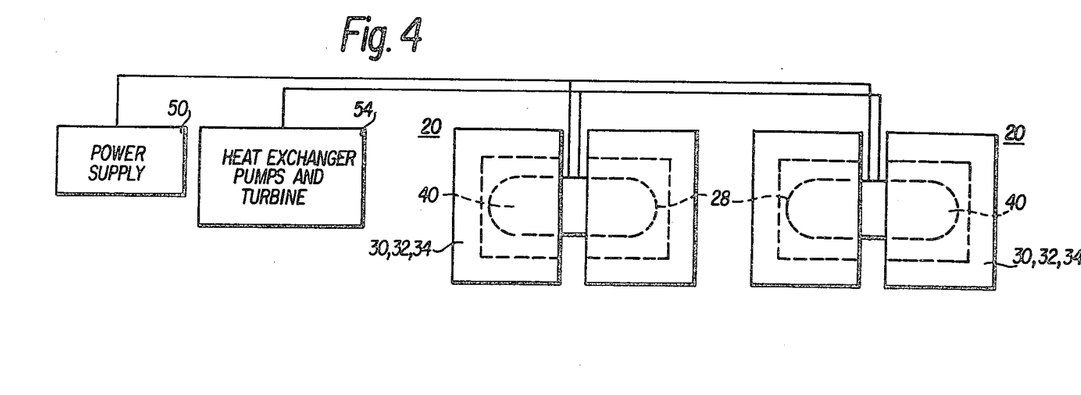
FIG. 4 is a block schematic diagram of a power generating device in accordance with the principles of the invention.

In operation of the fusion-fission power generating device there is typically provided a plurality of fusion-fission reactors as per FIG. 2 or 3 interconnected in a power generating plant. Such a system is schematically depicted in FIG. 4. FIG. 4 is illustrated for the fusion-fission unit 20 of FIG. 2 although it is readily understood that a similar system could be operated with respect to the corresponding elements of FIG. 3. The containment means 28 together with everything contained therein, in particular, the OH coils 36, the toroidal field coils 24', the fissile-fertile material 26 and the fusion region 22, form a unit which may be identified as a fusion-fission power core (FFPC) 40. The FFPC core 40 is in said recessed portion.

A unique advantage in accordance with the principles of the invention is that each of the fusion-fission reactors 20 is modular in the sense that the FFPC 40 may effectively be separated and removed from the remaining reactor elements for replacement by a replacement or substitute FFPC after the fissile-fertile material has been depleted to the extent that fission reactions no longer contribute in an optimum way to the overall energy production of the machine. Depending upon the operating parameters of the reactor 20, the fusion-fission power core 40 may be replaced on the order of yearly intervals.

FIG. 4 generally depicts the interconnection of the fusion-fission reactor to power supply means 50 and heat exchange, pumps and turbine apparatus 54. Power supply 50 is utilized to provide power to the OH and TF coils as well as power to auxiliary heating and equilibrium field coils (not shown) as are present in conventional Tokamak designs. The heat exchange, pumps and turbine apparatus 54 are generally interconnected to the fusion-fission power core 40 to extract thermal energy therefrom and simultaneously to cool the fusion-fission core during operation thereof. The overall interconnection of the fusion-fission power cores in a modular array to form a power generating plant may be similar to the modular fusion apparatus more fully illustrated in copending application entitled "Modular Fusion Power Apparatus Using Disposable Core", Ser. No. 841,903, incorporated herein by reference.

Figure 5:
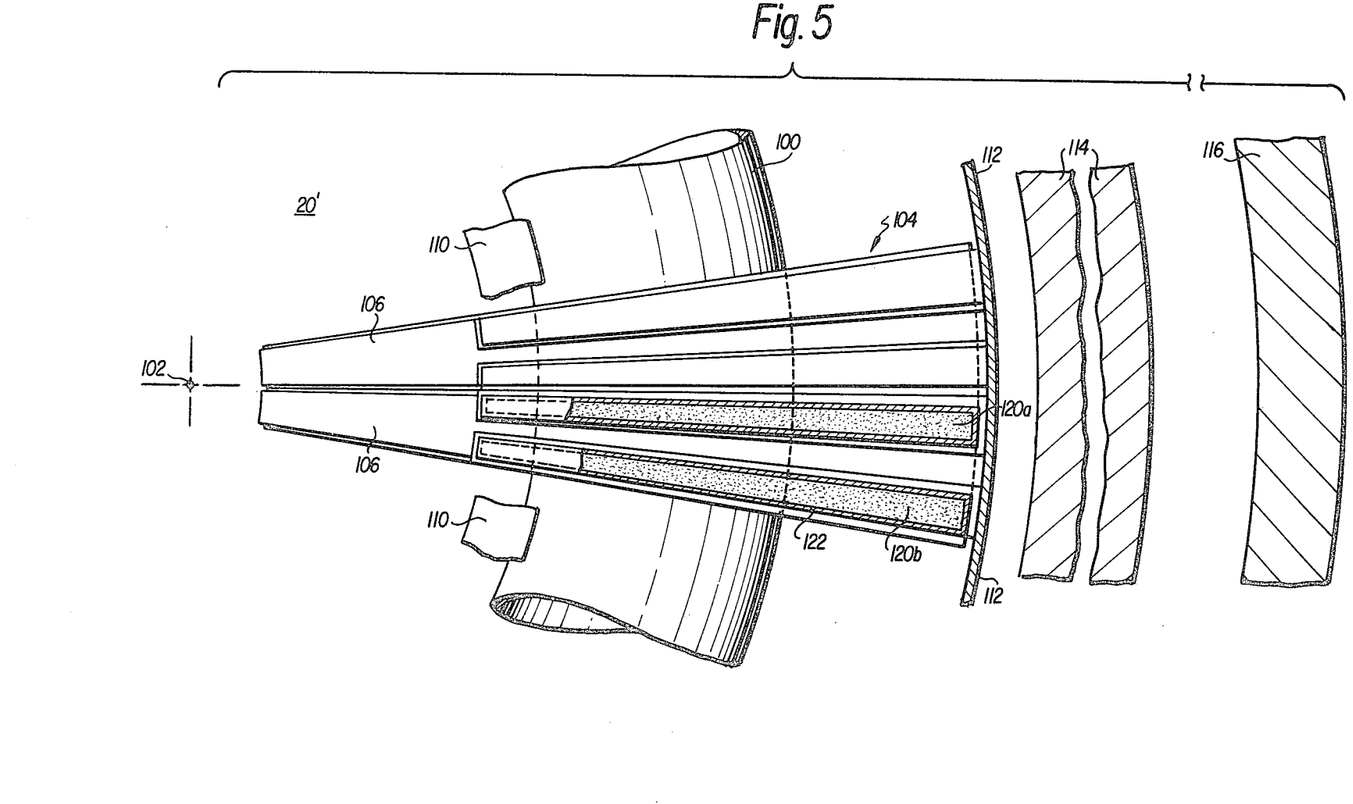
FIG. 5 is a partial plan view of the major components of the reactor in accordance with the principles of the invention.
Figure 6:
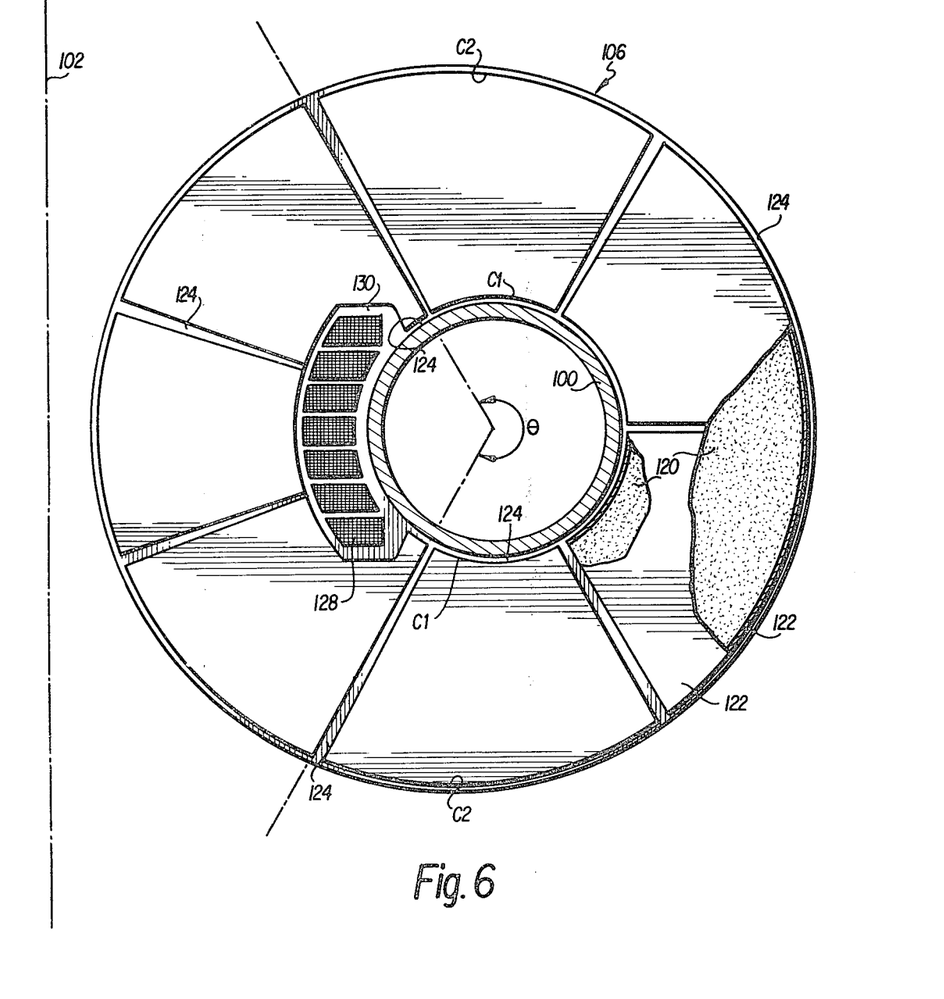
FIG. 6 is a side view of a toroidal field sector made in accordance with the invention.
Figure 7:
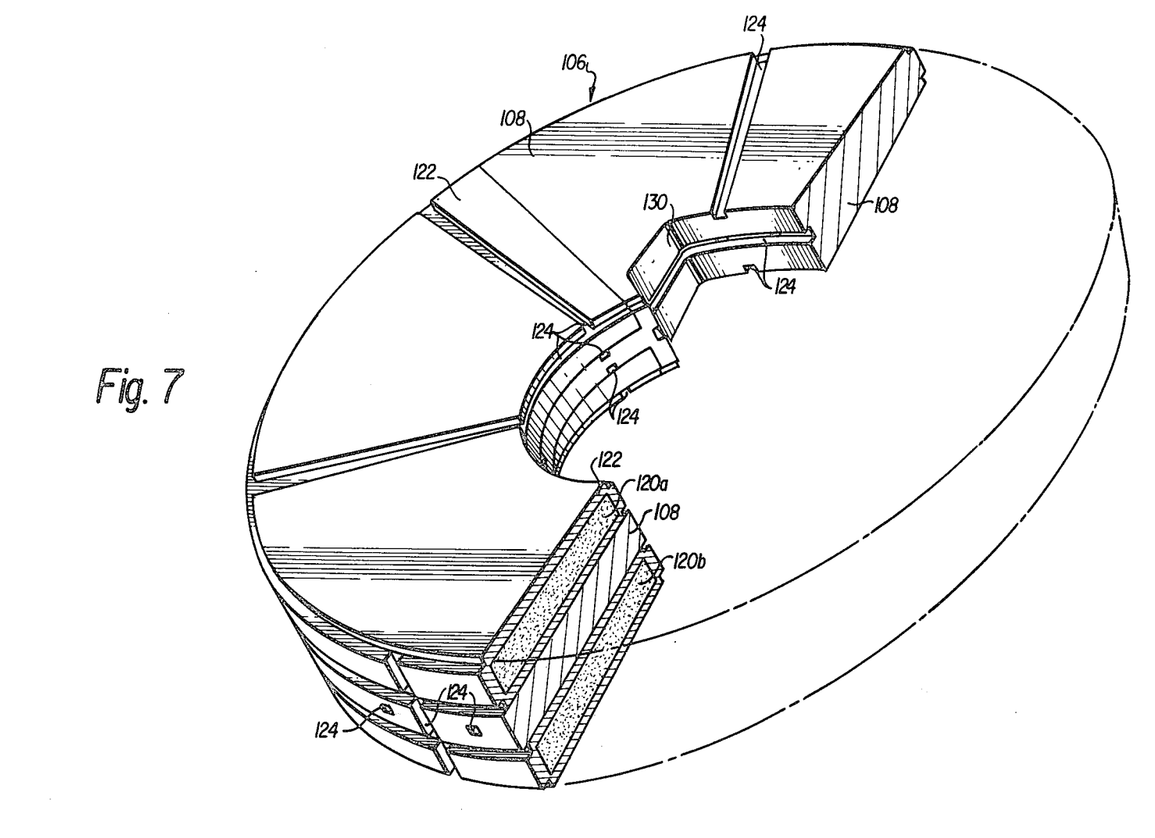
FIG. 7 is a perspective view of a toroidal field sector.

A more detailed illustration of the invention is shown in FIGS. 5–7. These figures depict the embodiment of FIG. 3 wherein the OH coils 36' are positioned interior of the toroidal field coils 24'. However, it is readily understood that the OH coils may be positioned as illustrated in FIG. 2 exterior of the TF coils as shown, for example, in the copending application referenced hereinabove. The structure of the toroidal field coils and the fissile-fertile material is substantially the same with the exceptions that the cut-out region for the OH coil within the TF coil structure is no longer present, and that the radial dimension of the TF coils toward the main axis of the toroid is reduced in order to allow space for the OH transformer in the region of the toroid main axis.

FIG. 5 is a top plan view of the portion of the fusion-fission reactor 20' wherein the main axis and center of the toroid is to the left in the drawing. The reactor comprises a plasma containment means 100 utilized to contain the fusion plasma gas, typically a mixture of deuterium and tritium. It is understood, however, that in addition to the d,t reaction additional fusion reactions may be utilized such as D,D or D,He$^3$ etc. The plasma containment means 100 is symmetric about the main axis 102. In both FIGS. 5 and 6, however, the main axis 102 is shown closer to the plasma containment means 100 than dictated by the scale factors of the drawing in order to illustrate in clear detail the novel toroidal field structure of the invention.

Surrounding the plasma containment means 100 is a toroidal field generating means generally indicated at 104 which comprises a plurality of TF sectors 106 each of which comprises the toroidal field coils 108. The main axis of the toroid defined by TF sectors 106 will typically coincide with the main axis of the containment means 100. FIG. 5 illustrates the OH coils 110, containment means 112, moderator/reflector 114 and T breeding section 116. The modulator/reflector 114 is shown segmented to indicate that it would typically be of a size larger than illustrated and would generally be on the order of the TF coil radius. Particular cooling and cladding of the modulator/reflector as well as the structure of the T breeding section 116 are well known in the art and are not shown for the sake of clarity.

In accordance with the novel aspects of the invention, the toroidal field sector 106 is seen to comprise a region of fissile-fertile material 120 such as, for example, natural uranium, or any of the uranium alloys such as uranium molybdenum, zirconium, etc. The fissile-fertile region within each of the TF sectors 106 is shown in the form of two separate regions namely, regions 120a and 120b, which effectively sandwich a portion of the TF coils 108 therebetween. Other arrangements are of course possible such as positioning the region 120 entirely on one side of the TF sectors 106. In reference to FIG. 6 it may be seen that the fissile-fertile material 120 does not extend completely around the TF sector 106 but rather is disposed primarily in the region away from the main axis 102. FIG. 6 illustrates that the fissile-fertile material region 120 is disposed around the TF sector 106 through an angle θ which may typically be on the order of 240°. It is additionally seen that the regions 120a and 120b optimumally extend to a region as close to the fusion region as possible to take maximum advantage of the neutron flux. Typically, the regions 120a and 120b extend from substantially the inner circumferential contour of the toroidal field coils 108 to substantially the outer circumferential contour thereof. These contours are shown by indicia C1 and C2 respectively.

The regions of fissile-fertile material 120a and 120b are encased in a cladding 122 which may typically be of stainless steel wherein there is provided a plurality of cooling channels (or grooves) 124. Cooling channels 124 are likewise provided throughout the TF coils 108, a few of which channels are illustrated in FIGS. 6 and 7. Because of the close proximity of the TF coils 108 to the plasma containment means 100, the entire region of the TF coils typically contains either radial cooling channels, as illustrated, or circumferential cooling channels if desired. These channels may be spaced on the order of a centimeter apart and may typically occur both within the TF coils 108 and on the cladding 122. As best illustrated in FIG. 6, these cooling channels may also be in fluid communication with a cut-out region 130 of the TF coils 108, to thereby cool the OH coils 128 which are illustrated as being inserted within cut-out region 130.

As a representative example of the dimensions of the apparatus of FIGS. 5-7, the toroid radius to the center of the plasma may be on the order of 50-100 cm, the plasma radius 20-50 cm, moderator/reflector region thickness 10-30 cm and the lithium T breeding section a distance from the center of the plasma on the order of 300 cm. The volume fraction of $U^{238}$ to Cu in the TF coils may typically be from 5-50%. For a plasma center taken as the origin, calculations using a cylindrical model geometry have shown a favorable selection of parameters as follows: plasma radius, approximately 23 cm; inner and outer radius of $U^{238}$-Cu region of TF coils, 23 cm and 33 cm respectively; inner and outer radius of moderator/reflector region, approximately 33 cm and 48 cm respectively; and lithium T breeding section extending from 300 cm to approximately 400 cm from the origin. The volume fraction of $U^{238}$ to copper is optimumally 20%, and number densities for $U^{238}$ and Cu may be taken as $8.7 \times 10^{21}$/cm$^3$ and $6.3 \times 10^{22}$/cm$^3$ respectively.

Particular details in regard to the structure of cooling channels for blanket regions as well as TF coil structures per se have been the subject of many studies in the prior art and reference is made to the aforementioned Review Meeting and Proceedings for additional details with respect thereto. Additional prior art toroidal coil designs are illustrated in U.S. Pat. Nos. 3,859,615 and 3,303,449 and cooling configurations for blanket regions and the like are well known in the art, such as, for example, Volumes I and II of *Tokamak Experimental Power Design Conceptual Design*, Argon National Laboratory, August 1976, ANL/CTR-76-3. Additionally, it is pointed out that the plasma containment region 100 although illustrated as a simple shell in practice may contain a coolant panel in fluid communication with the radial or circumferential cooling channels 124 within the TF coils 108 and cladding 122. Reference is made to the aforementioned ANL publication as representative of a typical design in relation to the vacuum vessel and coolant panel corresponding to the plasma containment means 100.

Although the plasma containment means 100 is illustrated as having a circular cross-sectional area, it is understood that additional designs recognized in the art are also possible, such as, for example, the D configuration well known in Tokamak studies. The corresponding TF generating means 104 is naturally designed consistent with the shape of the plasma containment means 100. Of particular significance with respect to the invention is however, that the TF coils 108 be positioned substantially adjacent (consistent with first wall loading and cooling requirements) to the plasma containment means 100 and additionally that the region of fissile-fertile material 120 is also positioned substantially adjacent to the plasma containment means 100. This particular arrangement allows optimization of the fusion-fission reaction and produces an extremely large burn up of the uranium fuel. This close proximity of the TF coil sectors 106 and the fissile-fertile region 120 to the fusion area permits a high fission-to-fusion energy production ratio on the order of 10:1.

This high ratio of fission to fusion energy allows operation of the FFPC at gross fusion power levels significantly less than those which would be required for operation of a pure fusion power device—in particular, FFPC lifetimes, as limited by radiation damage by fusion neutrons, may be ten or more times greater for the same net nuclear energy output (fission plus fusion)

than for fusion alone. Thus, this invention allows operation over FFPC lifetimes as high as one to two years. Over such long time periods the high fusion neutron flux will result in large burnup utilization of the $U^{238}$ in the coils, in proximity to the plasma. Indeed, calculations indicate that as much as 80% of the uranium should be fissioned in the first three centimenters of the fissile-fertile region 120 nearest the plasma containment means 100. Average burn up percentages are on the order of 50%.

In operation of the fusion-fission reactor or power generating means, high energy neutrons on the order of 14 Mev are generated by the d,t reaction within the plasma containment means 100. These neutrons cause fission of $U^{238}$ within the regions 120. The fission reactions generate fission fragments plus large amounts of energy on the order of 200 Mev/fission. Additionally, the fission reactions caused by fusion neutrons generate up to 4.5 neutrons per fission with neutron energies in the range of 1–5 Mev. These neutrons in turn generate slight additional fission reactions with $U^{238}$. Neutrons which escape the TF sectors 106 are slowed down in the moderator/reflector 114 and are reflected back into the fissile-fertile regions 120 wherein these low energy neutrons are captured by $U^{238}$ which eventually decays to $Pu^{239}$. The $Pu^{239}$, in turn, is fissile and thus fissions upon reactions with thermal neutrons (as well as fast neutrons). $Pu^{239}$ eventually reaches a saturation level which is sufficient to contribute significantly to the overall energy production of the reactor.

The particular composition and thickness of the moderator/reflector is selected to slow down and reflect neutrons into the fissile-fertile material at energies which optimize overall energy production of the reactor. The terminology "low energy neutrons" as utilized in the appended claims thus is intended to cover such neutron energies. For example, epithermal neutrons are expected to have large cross sections for n capture, and known resonance peaks in $U^{238}$ extend generally in the range of 6–200 ev. Thermal neutrons will also contribute to $Pu^{239}$ production.

An important aspect of the design of the fusion-fission reactor in accordance with the principles of the invention is in the positioning of the TF coils substantially adjacent the toroidal fusion region. Thus, while there is typically a vacuum chamber containing the plasma of the fusion region and while there may generally be a cooling region provided to cool the chamber first wall, the TF coils are positioned adjacent any such cooling region such that they are substantially adjacent to the fusion region itself. The positioning of the TF coils substantially adjacent the fusion region and the provision for positioning the fissile-fertile material in the region of the TF coils is a sharp contrast to prior art designs. It is clear that the terminology of placing the fissile-fertile material "within the region of the TF coils" does not require that the material coincide in a spatial sense with the electrically conductive coil material (copper, for example). The fissile-fertile material typically will be a distinct region positioned within the region defined between the inner and outer circumferential contour of the TF coils.

With respect to the OH coils, it is clear that these coils likewise are positioned substantially adjacent the fusion region but are located on the side of the toroidal fusion region nearest the main axis thereof.

Although the ohmic heating means in the form of ohmic heating coils has been described hereinabove in reference to a fusion-fission reactor or power generating device, it is clear that one may utilize the invention in a pure fusion type reactor or fusion type generating means. In particular, the fissile-fertile material within the region of the toroidal field coils may be eliminated as well as the modular/reflector utilized to slow and reflect the high energy neutrons. The remaining apparatus comprises a fusion power core which includes the containment means, toroidal field coils, ohmic heating coils and fusion region. The fusion power core may be interconnected with means for extracting thermal energy from the fusion power core in a modular array as more fully set forth in, for example, copending application Ser. No. 841,903 cited above. In such an arrangement the fusion power core may be an integral unit which is separable from the fusion power generating means and replaceable by a different fusion power core after, for example, excessive radiation damage of the TF coils. Preferably, in order to optimize the coupling of the OH coils to the fusion region, these coils are located substantially adjacent the fusion region on a side nearest the main axis of the toroidal fusion region.

Although the invention has been described in terms of selected preferred embodiments, the invention should not be deemed limited thereto since other embodiments and modifications will readily occur to one skilled in the art. It is therefore to be understood that the appended claims are intended to cover all such modifications as fall within the true spirit and scope of the invention.

I claim:

1. A compact toroidal fusion reactor for producing energy from fusion reactions having a plasma containing toroidal fusion region and having a main axis, comprising:
    (a) a toroidal field generating means for producing a toroidal magnetic field in said fusion region upon the passage of current therethrough, said toroidal field generating means having an inner circumferential contour and an outer edge, said inner circumferential contour having a recessed portion extending for an arcuate section along the side nearest said main axis and being positioned substantially immediately proximate said toroidal fusion region; and
    (b) ohmic heating coils for ohmically heating said plasma, said ohmic heating coils positioned adjacent to said toroidal fusion region and between said toroidal fusion region and said toroidal field generating means in a region provided on the inner circumferential contour of said toroidal field generating means along the side nearest the main axis of said toroidal fusion region.

2. A fusion reactor as recited in claim 1 wherein said toroidal field generating means comprises a plurality of toroidal field coils each having an inner circumferential contour and an outer edge.

3. A fusion reactor as recited in claim 1 wherein said fusion reactor further comprises means for producing fission reactions and wherein said fission producing means comprises a region of fissile-fertile material positioned within the region of said toroidal field generating means.

4. A fusion reactor as recited in claim 3 wherein said toroidal field generating means comprises a plurality of toroidal field coils forming a toroid about a main axis and having an inner circumferential contour positioned substantially adjacent said toroidal fusion region except in the region of said ohmic heating coils and wherein said fissile-fertile material is positioned primarily on the side away from the main axis of said toroidal coils.

5. A fusion reactor as recited in claim 4 wherein said fissile-fertile material forms discrete regions within the region of said plurality of toroidal field coils and extends generally from the inner circumferential contour of said toroidal coils to an outer circumferential contour of said toroidal coils on the side away from the main axis of the toroidal coil.

6. A fusion reactor as recited in claim 5 or 1 wherein the main axis of said toroidal field generating means coincides with the main axis of said toroidal fusion region.

7. A method of increasing efficiency of a fusion reactor of a toroidal configuration having a main axis and having toroidal field generating means with an inner contour positioned substantially immediately adjacent a toroidal fusion region and ohmic heating coils for ohmically heating plasma within said toroidal fusion region comprising the steps of forming a recessed portion in said inner contour of said toroidal field generating means extending for an arcuate section along a side nearest the main axis and positioning said ohmic heating coil between the toroidal fusion region and the toroidal field generating means in said recessed portion region whereby space is made available near the axis of the toroidal fusion region.

8. A method as recited in claim 7 further comprising the steps of utilizing the space made available near the main axis of the fusion region by increasing the radial dimension of the toroidal field generating toward a side nearest the main axis of said toroidal fusion region, to increase the cross-sectional area of the toroidal field generating means in the region nearest the main axis of the toroidal fusion region.

* * * * *

UNITED STATES PATENT AND TRADEMARK OFFICE
CERTIFICATE OF CORRECTION

PATENT NO. : 4,370,296
DATED : January 25, 1983
INVENTOR(S) : Robert W. BUSSARD

It is certified that error appears in the above—identified patent and that said Letters Patent is hereby corrected as shown below:

Column 3, lines 55-56, delete "TF coils 34'" and insert therefor -- TF coils 24' --.

Column 4, line 18, delete "FFPC core" and insert therefor -- FFPC --.

Signed and Sealed this

Seventh Day of June 1983

[SEAL]

Attest:

DONALD J. QUIGG

Attesting Officer

Acting Commissioner of Patents and Trademarks